INVENTOR.
FRANCIS R. ELDRIDGE, JR.
BY
Walter G. Finch
ATTORNEY

INVENTOR.
FRANCIS R. ELDRIDGE, JR.
BY
Walter G Finch
ATTORNEY

Oct. 12, 1965

F. R. ELDRIDGE, JR
PULSE RESPONSIVE DRUM CONTROL
AND READOUT CIRCUIT 3,212,059

Original Filed July 29, 1955

INVENTOR.
FRANCIS R. ELDRIDGE, JR.
BY
Walter G. Finch
ATTORNEY

United States Patent Office 3,212,059
Patented Oct. 12, 1965

3,212,059
PULSE RESPONSIVE DRUM CONTROL
AND READOUT CIRCUIT
Francis R. Eldridge, Jr., Pacific Palisades, Calif., assignor of thirty percent to Walter G. Finch, Baltimore County, Md.
Continuation of application Ser. No. 525,217, July 29, 1955. This application Mar. 13, 1961, Ser. No. 95,773
4 Claims. (Cl. 340—147)

This invention relates generally to apparatus and a method for transmitting intelligible information, and more particularly to apparatus and a method for selecting and combining recorded data for audible or visual reproduction in response to pulses transmitted from a remote point in space. This application is a continuation of U.S. patent application Serial Number 525,217, filed July 29, 1955, by applicant for "Audible Data Receiver," now abandoned.

It is well known that intelligible information of the character transmitted by data links from digital computers, keyboard and tape transmitters, as well as numerous other sensing devices, can be composed of a relatively small vocabulary of words and/or numbers. This information may pertain to weather data, telemetering data, landing or flight instructions, attack intelligence or orders, or the like.

Ordinarily such data are transmitted by a system, such as telephone, radio, facsimile or television employing electrical signals, which have a one-to-one correspondence, in amplitude and bandwidth, with the voice sounds or the scanned visual light intensities which the system receives.

It is known from information theory that systems such as those referred to above transmit much more than the minimum amount of information required to convey the desired intelligence. Thus, systems of this type have the material disadvantage of requiring a broad bandwidth, which introduces extraneous noise and reduces the reliability of the received signals. Such broad bandwidths further reduce the number of channels of intelligible information which can be utilized at any one time within a given spectral region.

Another major disadvantage of conventional systems, such as teletype, facsimile, and data transmission systems, is that they require some type of printed record, which is generally cumbersome as well as uneconomical. In addition, such systems are mechanically intricate and complex. Other disadvantages of systems of this type are that the rate of message reception must be equal to the rate of message transmission; the coding of voice signals requires intricate transmitting and receiving equipment; and such systems are easily jammed by extraneous signals.

It is the principal object of this invention to provide a method as well as apparatus for selecting and combining recorded data for audible or visual reproduction in response to pulses transmitted from a remote point in space.

It is another object of this invention to provide a method as well as apparatus for more efficiently and economically transmitting intelligible information. This is achieved by utilizing electro-mechanical apparatus, including signal storage and selection devices which are controlled by transmitted pulses to reproduce audible or visual signals of selected words, numbers, phrases or pictures, or combinations thereof.

Still another object of this invention is to provide an audible data receiving apparatus which is remotely controlled by a combination or plurality of combinations of transmitted pulses to reproduce selected data visually.

It is further an object of this invention to provide a compact data reproducing and data selecting apparatus which is suitable for portable use or for installation in aircraft and in other forms of transportation vehicles.

It is a further object of this invention to provide an audible or visual data apparatus capable of selecting and reproducing any combination or plurality of combinations of a fixed set of recorded words, numbers, phrases or pictures in response to a transmission from a remote point in space of a group or groups of pulses which are counted by electro-mechanical apparatus at the receiver.

It is the further object of this invention to provide a method as well as an audible or visual data receiving apparatus capable of selecting and reproducing any combination or plurality of combinations of a fixed set of recorded words, numbers, phrases or pictures in response to a transmission from a remote point in space of a group or groups of binary numbers sent as a combination or combinations of pulses and spaces, and in which the number of recorded items available for selection may be doubled by each additional baud (a space or pulse) used in the pulse group or groups.

Another object of this invention is to provide apparatus for storing incoming pulses for use in selecting and reproducing any one of a fixed set of recorded words, numbers, phrases or pictures at a selected future time.

And it is a further object of this invention to provide an audible or visual data apparatus which may be remotely controlled by pulse transmission utilizing landline, radio, sound, light, or any other suitable medium.

It is another object of this invention to provide apparatus for reproduction of visual data by remote control from equipment, such as digital computers, teletype, telegraph, tape transmitters or any other form of apparatus capable of producing pulse groups.

These and other objects and advantages of this invention will become more readily understood from the accompanying specification and drawings in which.

In accordance with the invention, apparatus is provided for selecting a sequence of a plurality of recorded data signals which may have a bandwidth of any desired frequency range, such as ranging from television signals to slow pulse signals representative of Morse code, slow telemetering signals or teletype signals.

This apparatus comprises means for generating and transmitting information pulse signals from a remote point in space, such as a radio transmitter fed by a digital computer or any other electro-mechanical means for generating the type of pulse signals desired, together with means for receiving these pulse signals, such as preferably a narrowband radio receiver or telephone receiver. The receiver can be located in an aerial vehicle, land craft, ship or at some remote monitoring control center, or, in some cases, it may be located in the vicinity of the generating and transmitting apparatus.

In addition, apparatus is provided for storing and utilizing the received pulse signals to select a sequence of the plurality of recorded data signals to convey the desired intelligence information which can be subsequently utilized by a human receiver for functional purposes, such as to control an aircraft landing operation, a rendezvous, an intercept, for navigation, transmission of weather information; or for a coder to change from one type of pulse signal to a pulse signal of a different type; and as a language translator for translating a vocabulary of English to German words or vice versa, to name only a few uses of the invention.

A sensing means can be provided in conjunction with the apparatus mentioned above to sense the selected sequence of recorded data signals to produce intelligence therefrom. This sensing means can include a mechanism for recording the data signals which are sequentially selected by transmitted pulses, a device for sensing the recorded data signals, a selector switch which selects any one of the plurality of recorded data signals, and apparatus, such as an audio-amplifier and speaker, for presenting the recorded data signals for audible reception. In the event it is desired to have visual reception of the recorded data signals, a facsimile receiver or television receiver can be provided.

Figure 1:
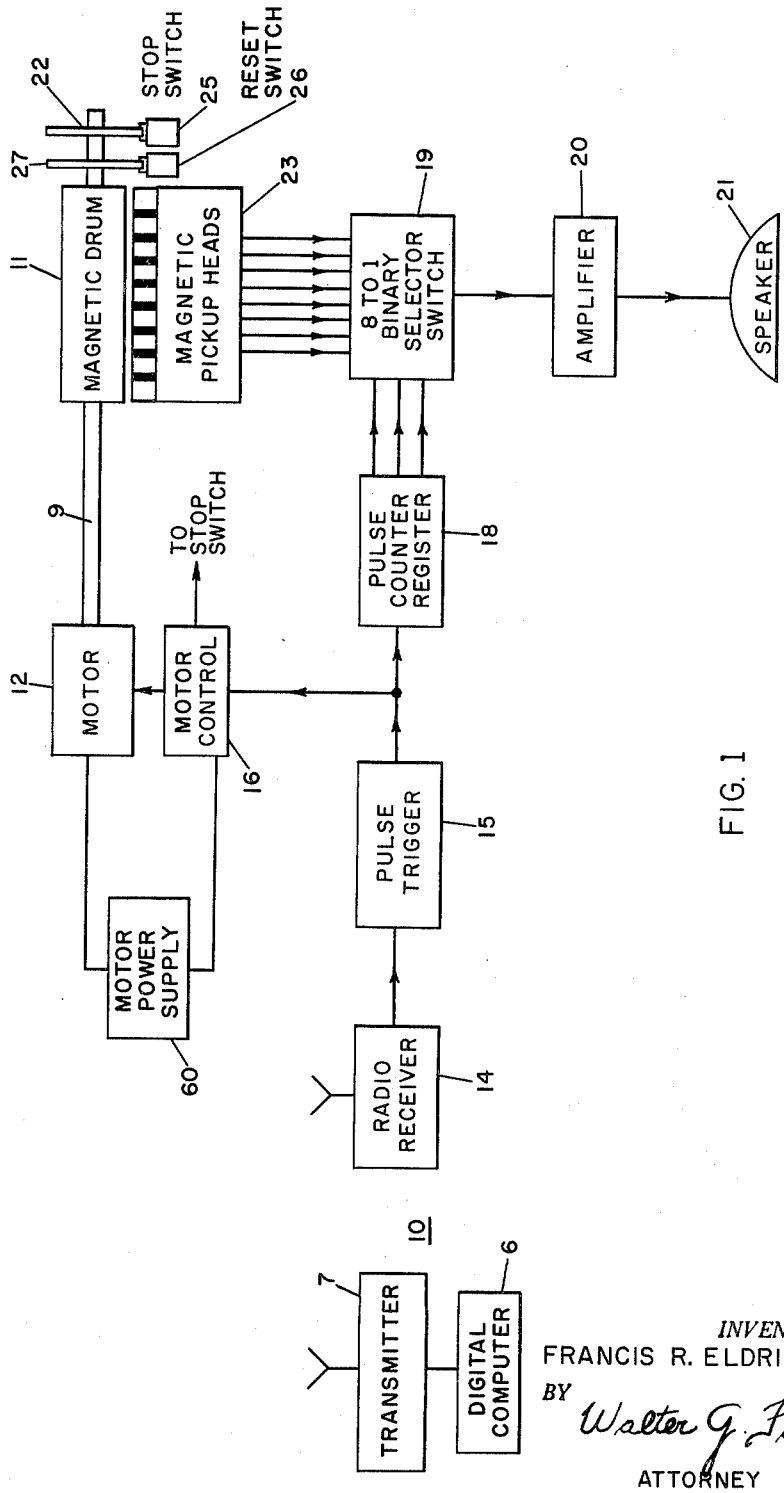
FIG. 1 is a schematic of one form of the apparatus comprising the invention for counting received pulses and using the pulse counts for selecting a previously recorded audible or visual signal.

Referring now to FIG. 1 of the drawings, there is illustrated means 10 for generating and transmitting groups of information pulse signals from a remote point, such as a conventional radio transmitter 7 fed from a digital computer 6 having means for generating groups of pulse signals. This computer 6 and related apparatus including the transmitter 7 can be located at a remote point in space, for example, aboard an aircraft control center, aboard a ship, or at various warning and fire control centers.

These groups of pulse signals are received by means of a conventional radio receiver 14, which is preferably of a narrowband type and which is frequency or amplitude modulated. These signals are then passed into a conventional pulse trigger 15, which sharpens the received pulses for use in the remainder of the electrical controls of the system.

The sharpened pulse signals are then simultaneously passed to a motor control circuit 16 and a pulse counter register 18. This circuit 16 and register 18 will be described more in detail subsequently. The first received pulse signal in a group is utilized to switch on a motor 12, such as a synchronous A.C. motor or a constant speed D.C. motor. The remaining pulses in the group are received by the motor control circuit 16 but do not further affect the operation of the circuit 16 as will be pointed out later. This motor 12, in turn, directly drives a magnetic drum 11 which is connected to motor 12 through a mechanical shaft 9. A motor power supply 60, such as a 60 cycle A.C. or a D.C. supply, is connected between the motor control 16 and the motor 12.

Vocabulary words are stored on the conventional magnetic drum 11. Twenty-five or more words, each on an individual track, may be stored on each inch of drum length. In each cycle of operation of the apparatus during which one word is spoken, the drum 11 is rotated one complete revolution by the motor 12 at a speed of approximately 100 revolutions per minute. A conventional multihead magnetic pick-up 23 is inductively linked with the tracks on the magnetic drum 11. In FIG. 1, for example, there is illustrated an eight-head magnetic pick-up 23, with each head thereof being inductively linked with a corresponding track on the magnetic drum 11.

In the meantime, the same group of sharpened pulse signals from the pulse trigger 15 are received and stored in the pulse counter register 18, which is a binary type counter. In the apparatus shown, the counter register 18 produces three binary output signals which represent the binary count of the number of pulses received by the radio receiver 14. These signals are utilized to control an 8-to-1 binary selector switch 19, which will be described more in detail presently. This switch 19 selects one of the signals from the multi-head pick-up 23 and feeds an output signal to an audio-amplifier 20 and a speaker 21 for reception by a human receiver who can utilize the signals for the purposes desired, such as command, control, or information purposes.

A single-pole, double throw stop switch 25 is provided to cut off the motor control circuit 16. This switch 25 is actuated by the shaft 9 through a cam mechanism 22, which switches off the motor 12 to stop the rotation of the magnetic drum 11. The motor 12 remains in an off-condition until the first pulse of the next group of pulses is received by the radio receiver 14 as previously mentioned. A single-pole, double throw reset switch 26 is also provided to switch in a 220 volt power supply 63, shown in FIG. 2 and which will be subsequently described, to reset the pulse counter register 18. Switch 26 is operated in the same manner as stop switch 25, that is, it is actuated by the shaft 9 through a cam mechanism 27.

Figure 2:
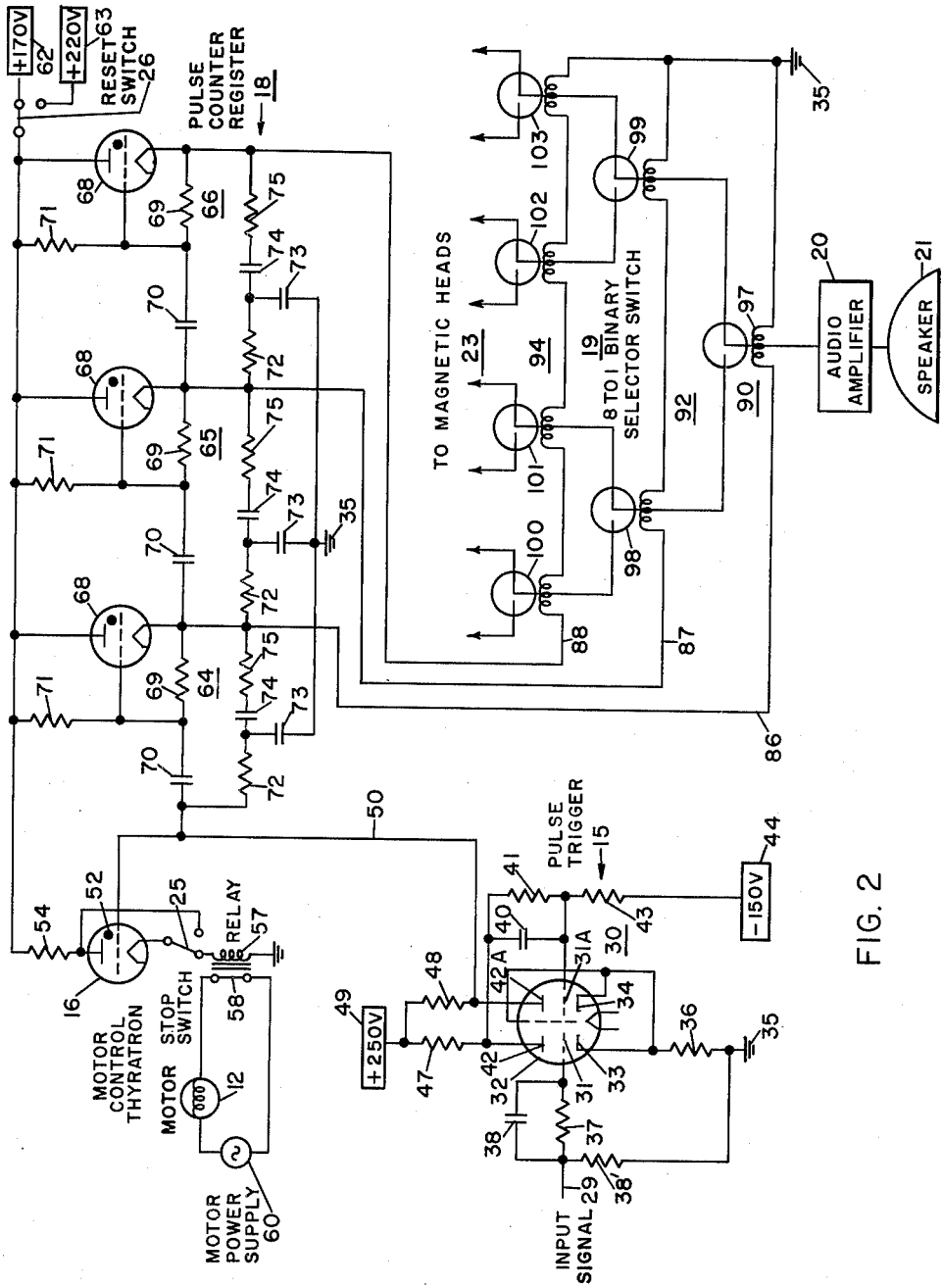
FIG. 2 is a schematic of the electrical control portion of the apparatus illustrated in FIG. 1.

Referring now to FIG. 2, there is shown the electrical circuit for the apparatus of FIG. 1. The output signals from the radio receiver 12 in FIG. 1 are passed by lead 29 in FIG. 2 to the pulse triggering circuit 30 of the pulse trigger 15. This circuit 30 consists of a conventional one-shot multivibrator. It consists of a dual-triode 32 which has its cathodes 33 and 34 connected to ground 35 through a common biasing resistor 36. A pulse shaping network consisting of a resistor 37 and a capacitor 38 is connected between the first grid 31 of the dual-triode 32 and a biasing resistor 38'. Resistor 38', in turn, is connected to ground 35.

The second grid 31A of the dual-triode 32 is connected to a delay network consisting of a capacitor 40 and a resistor 41, with one side of the delay network being connected to the first plate 42 of the dual-triode 32. The second grid 31A of the dual-triode 32 is also connected through a resistor 43 to the negative side of a suitable voltage source 44, such as a 150 volt power supply. The two plates 42 and 42A of the dual-triode 32 are connected through resistors 47 and 48 to the positive side of a suitable voltage source 49, for example, a 250 volt power supply.

The second plate 42A of the dual-triode 32 is connected through a lead 50 to the input of the motor control circuit 16. This circuit 16 consists of a control thyratron 52, a relay 57, and a resistor 54. The grid of the thyratron 52 is connected to lead 50 from the second plate 42A of the dual-triode 32. The cathode of the thyratron 52 is connected to relay 57 through the stop switch 25, which, as previously mentioned, is of a single-pole, double throw type. The contact switch 58 of relay 57 is connected to the synchronous A.C. motor 12 and the alternating current power supply 60, such as mentioned for FIG. 1. The plate of thyratron 52 is connected through resistor 54 to the positive side of a 170 volt power supply 62 through the reset switch 26. This reset switch 26 is utilized at the end of a cycle of operation to switch in the 220 volt power supply 63 to reset the pulse counter register 18. The plate of thyratron 52 is also connected to the stop switch 25.

The second plate 42A of the dual-triode 32 is also connected by lead 50 to the first stage 64 of three binary stages 64, 65, and 66, of the pulse counter register 18. Each stage 64, 65, and 66 consists of identical elements. For example, stage 64 consists of a thyratron tube 68, which has its cathode connected to one stage 90 of three stages 90, 92, and 94, of the binary selector switch 19. The cathode of this stage 64 is also connected to the grid of thyratron 68 through a biasing resistor 69. The input into stage 64 is coupled to the grid of thyratron 68 through a capacitor 70. The grid of thyratron 68 is also connected through a biasing resistor 71 to the positive side of the 170 volt power source 62. The input into stage 64 is also coupled through a delay network consisting of a resistor 72 and a capacitor 73 by means of a capacitor 74 and a resistor 75 to the cathode of the thyratron 68. Capacitor 73 is also connected to ground 35. As previously pointed out, each stage 64, 65, and 66 of the pulse counter register 18 has identical elements. Consequently, these elements have been given identical reference numerals.

The input to stage 65 of the pulse counter register 18 is from the cathode of the thyratron 68 of the first stage 64, while the input to stage 66 is from the cathode of thyratron 68 of the second stage 65. The outputs from the three stages 64, 65, and 66 of the pulse counter register 18 are passed by leads 86, 87, and 88, to stages 90, 92, and 94, respectively, of the binary selector switch 19.

Stage 90 of the binary selector switch 19 consists of a single pole, double throw relay 97; while stage 92 of the switch 19 consists of two single pole, double throw relays 98 and 99; and stage 94 consists of four identical single pole, double throw relays 100, 101, 102, and 103. The solenoids of the relays are connected in series to ground 35.

The eight magnetic pick-up heads of the multi-head magnetic pick-up 23 are connected to the four relays 100, 101, 102, and 103, of stage 94 of the binary selector switch 19. The poles of relays 100 and 101, and the poles of relays 102 and 103 are connected to relays 98 and 99, respectively, of stage 92 of the binary selector switch 19. The poles of relays 98 and 99, in turn, are connected to relay 97 of stage 90 of the binary selector switch 19. The pole of relay 97, in turn, is connected to the audio amplifier 20 and speaker 21.

The operation of the system described in FIGS. 1 and 2 will now be explained. Digital computer 6 transmits a group of pulse code signals to the transmitter 7, which keys a carrier frequency in response to the group of pulse code signals received from computer 6. The keyed carrier group of signals is then received by the radio receiver 14 which demodulates the signals and transmits D.C. pulse signals to the pulse trigger 15.

The pulse trigger 15 then shapes the D.C. pulse signals to give signals having a fast rise time and of a duration great enough to trigger the thyratrons 52 and 68, of FIG. 2. The first D.C. pulse signal triggers the motor control thyratron 52. Thyratron 52 then actuates relay 57, which closes relay switch 58 to connect the power supply 60 to the motor 12.

Motor 12 then turns the magnetic drum 11 through shaft 9 of FIG. 1 one complete revolution until the cam mechanism 22 actuates the stop switch 25 to short out the thyratron 52, shown in FIG. 2. Motor 12 continues to turn until the cam mechanism 22 releases the stop switch 25. This cuts off the relay 57 which releases relay switch 58 to cut off motor 12 from its power supply 60. In this state, the motor control 16 is ready for the first pulse of the second group of received pulses.

The thyratron 68 of the first stage 64 of the pulse counter register 18 as well as the corresponding thyratrons 68 in stages 65 and 66 were reset at the end of the previous cycle of operation and are now in a conducting condition.

Pulse counter register 18 counts the pulses in the following manner:

The first pulse puts stage 64 in a non-conducting condition by forcing the cathode of thyratron 68 of stage 64 to a positive value thru the charged capacitor 74.

The second pulse puts stage 64 in a conducting condition by causing the grid of thyratron 68 of stage 64 to go sufficiently positive to ionize the gas in the tube 68 of stage 64. As the cathode of thyratron 68 of stage 64 rises to 120 volts, it causes a carry pulse to be fed to the stage 65 of the pulse counter register 18. A carry pulse from stage 64 puts stage 65 into a non-conducting condition by forcing the cathode of the thyratron 68 of stage 65 to be of sufficient positive magnitude to cut off stage 65 of the pulse counter register 18. The third pulse puts stage 64 in a non-conducting condition. No carry pulse originates from stage 64. Therefore, stage 65 remains in a non-conducting condition.

The fourth pulse puts stage 64 in a conducting condition. This gives rise to a carry pulse from stage 64 to stage 65 and stage 65 goes to a conducting condition. Stage 65 originates a carry pulse to stage 66 and stage 66 is placed in a non-conducting condition. The fifth pulse puts stage 64 in a non-conducting condition. Since there is no carry pulse from stage 64, stages 65 and 66 remain in the same condition. The sixth pulse puts stage 64 in a conducting condition. A carry pulse originates from stage 64 which puts stage 65 in a non-conducting condition.

The seventh pulse puts stage 64 in a non-conducting condition. There is no carry pulse from stage 64 so stages 65 and 66 remain in a non-conducting condition. The eighth pulse puts stage 64 in a conducting condition. This gives rise to a carry pulse which puts stage 65 in a conducting condition. Stage 65 has a carry pulse which puts stage 66 in a conducting condition. The ninth pulse passed by lead 50 is equivalent to the first pulse received. Therefore, the ninth to sixteenth pulses recycle the counting system in the manner described above.

Ordinarily, the pulse count can stop at any time after one to eight pulses have been received by the system. The final binary count of the pulses is recorded as voltages or no-voltages by leads 86, 87, and 88, depending upon whether or not thyratron 68 in stage 64 and the corresponding thyratrons 68 in stages 65 and 66 are in conducting or non-conducting conditions. Any voltages recorded by leads 86, 87, or 88 actuate the relays in the binary selector switch 19. For example, a voltage recorded by lead 86 will be utilized to actuate relay 97 in stage 90; while a voltage recorded by lead 87 will actuate the relays 98 and 99 of stage 92; and a voltage recorded by lead 88 will actuate the relays 100, 101, 102, and 103 of stage 94, of the binary selector switch 19. When there is no voltage recorded by lead 86, the pole of relay 97 is connected to the pole of relay 99. However, if a voltage is recorded by lead 86, relay 97 is switched, connecting the pole of relay 97 to the pole of relay 98. The remaining relays in stages 92 and 94, of the binary selector switch 19, operate in an identical manner. The binary count on leads 86, 87, and 88, in this way, transmit the signal from only one head of the multi-head magnetic pickup 23 to audio-amplifier 20 and speaker 21 or to earphones (not shown).

Figure 3:
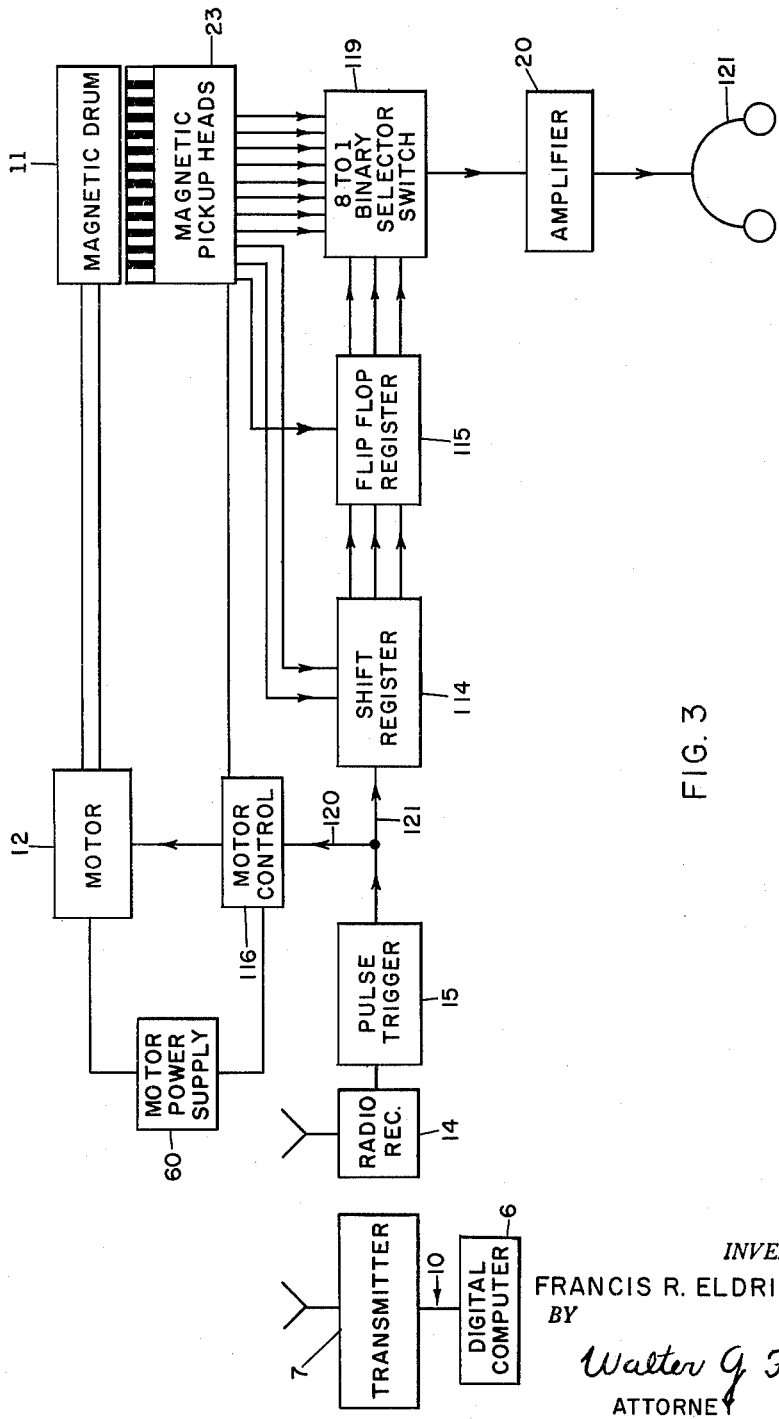
FIG. 3 is a schematic of a second embodiment of the apparatus comprising the invention for storing and utilizing binary pulses for selecting audible or visual signals.
Figure 4:
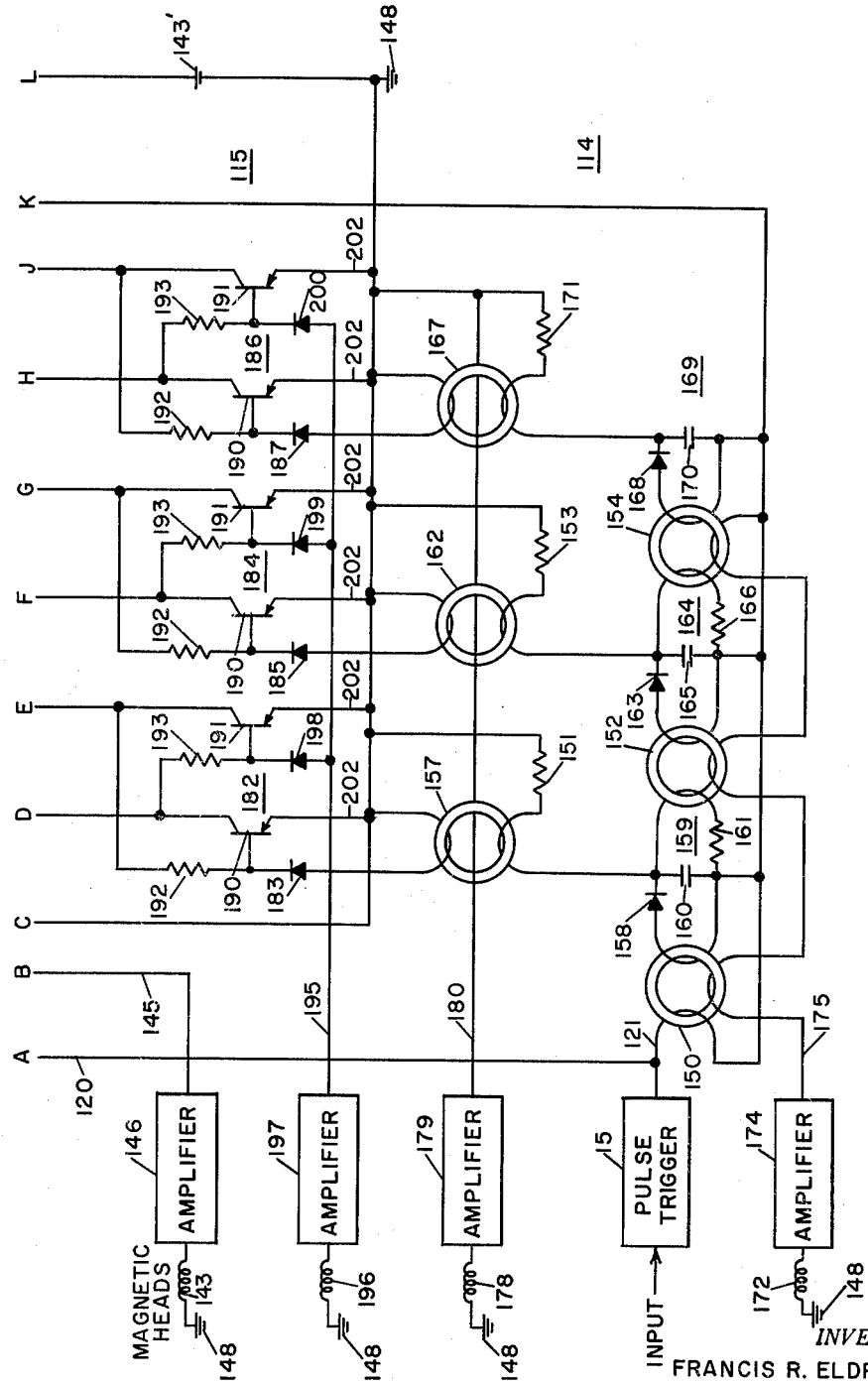
FIG. 4 is a part of a schematic of the electrical control portion of the apparatus illustrated in FIG. 3.
Figure 5:
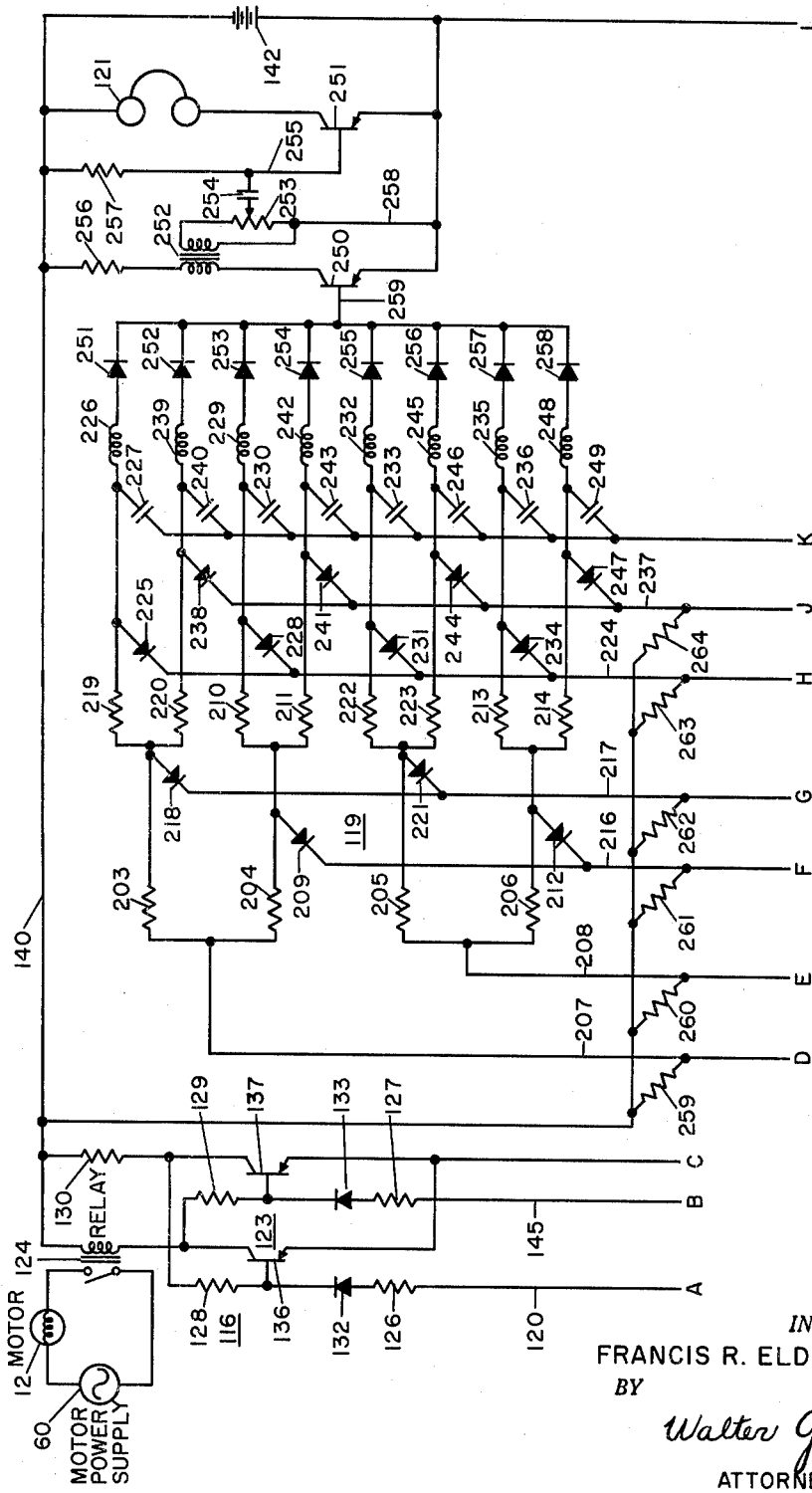
FIG. 5 is a continuation of the schematic of FIG. 4.

A modification of this system is shown in FIGS. 3, 4, and 5. This modified system differs from the one described above in that it receives continuous binary information from the transmitter 7 rather than pulse groups and has two registers 114 and 115, which replace the pulse counter register 18 of FIGS. 1 and 2. Stop switch 25 and reset switch 26, as well as the cam mechanisms 22 and 27 of FIGS. 1 and 2 are replaced by control pulses which are permanently recorded on the magnetic drum 11. Four extra heads are provided on the multi-head magnetic pick-up 23 to pick up these control pulses and they are used to actuate the motor control 116, the shift register 114, and the flip-flop register 115. The shift register 114 stores incoming pulses during one cycle of operation and shifts them to the flip-flop register 115 at the end of this cycle. These information pulses are held in the flip-flop register 115 during the next cycle and are then used to actuate a binary selector switch 119 during that cycle of operation. In this way, slow binary pulses can be received continuously and do not interfere with the word selection control system.

As previously indicated for the embodiment of the invention illustrated in FIGS. 1 and 2, the groups of binary pulse signals are received by means of a conventional radio receiver 14. The radio receiver 14 utilized with the apparatus of FIGS. 3, 4, and 5 is preferably of even a narrower band type than was used in the other embodiment of the invention and is frequency or amplitude modulated. These binary pulse signals are then passed into the pulse trigger 15 (which is the same in both embodiments of the invention), which sharpens the received pulses for use in the remainder of the electrical controls of the apparatus illustrated in FIGS. 4 and 5. Instead of utilizing a pulse trigger 15 as previously described, a transistorized version can be employed. For example, a transistor flip-flop arrangement can be utilized. The sharpened pulse signals are then simultaneously passed to the motor control circuit 116 and the shift register 114 by means of leads 120 and 121, respectively.

As seen in FIGS. 4 and 5, the motor control circuit 116 consists of a transistor flip-flop arrangement 123 which actuates a single pole, single throw relay 124 to switch the motor power supply 60 on to operate the motor 12. The transistor flip-flop arrangement consists of five resistors 126, 127, 128, 129, and 130, two diodes 132 and 133, and two transistors 136 and 137 which are connected so that only one transistor 136 or 137 is conducting at any one time. When transistor 136 conducts, it shuts off transistor 137 and actutaes relay 124 so that the single pole, single throw relay switch 124 is closed. When transistor 137 conducts, it shuts off the current flow through transistor 136 and opens the single pole, single throw relay switch 124 to cut off the power supply 60 to the motor 12. The transistor flip-flop arrangement 123 is connected by lead 140 to the positive side of a 6 volt battery composed of two sections 142 and 143' of 4½ and 1½ volts, respectively.

Transistor 136 is made to conduct by supplying a positive pulse through lead 120 from the pulse trigger 15. Transistor 137, on the other hand, is made to conduct at the proper time in the operating cycle by supplying a positive pulse from one of the four extra heads 143 provided on the multi-head magnetic pickup 23 through a conventional pulse amplifier 146 and lead 145. Magnetic head 143 is connected to ground 148.

The shift register 114 consists of three magnetic core stages 150, 152, 154. Thus, a pulse signal passed to the shift register 114 by lead 121 is recorded by the first magnetic core stage 150, and subsequently passed to stages 152 and 154. The magnetic core stage 150 is coupled to the second magnetic core stage 152, and also to a buffer magnetic core 157 by means of a diode 158 and a delay circuit 159 consisting of a capacitor 160 and resistors 161 and 151.

The second magnetic core stage 152 is coupled to the third magnetic core stage 154 and to a second buffer magnetic core 162 by a similar circuit consisting of a diode 163 and a delay circuit 164 consisting of a capacitor 165 and resistors 166 and 153. The third magnetic core stage 154 is coupled to a third buffer magnetic core 167 through a diode 168 and a delay circuit 169 comprising a capacitor 170 and resistor 171.

The second extra head 172 provided on the multihead magnetic pickup 23 is coupled to all three magnetic core stages 150, 152, and 154 through a conventional pulse amplifier 174 by means of a lead 175. The head 172 is also connected to ground 148. The third extra head 178 provided in the magnetic pickup 23 is coupled to buffer magnetic cores 157, 162, and 167 through an amplifier 179 by means of a lead 180. This head 178 is likewise connected to ground 148.

Buffer magnetic cores 157, 162, and 167 are coupled to the flip-flop register 115 consisting of three transistor flip-flop stages 182, 184, and 186 through diodes 183, 185, and 187 respectively. Each transistor flip-flop stage 182, 184, and 186 consists of identical elements, that is, two transistors 190 and 191 and two resistors 192 and 193. The fourth extra head 196 provided in the magnetic pickup 23 is coupled through a conventional pulse amplifier 197, a lead 195, and three diodes 198, 199, and 200 to the three transistor flip-flop stages 182, 184, and 186. Head 196 is also connected to ground 148. The emitters of all transistors 190 and 191 are connected to ground 148 by leads 202.

The transistor flip-flop stages 182, 184, and 186 are coupled to the binary selector switch 119. The first transistor 190 of stage 182 is coupled directly to a resistance network which is comprised of resistors 203 and 204, while the second transistor 191 of the first transistor flip-flop stage 182 is connected to a resistance network consisting of resistors 205 and 206 by leads 207 and 208, respectively.

The first transistor 190 of the second transistor flip-flop stage 184 is connected by a lead 216 through a diode 209 to the resistor 204 and to a resistance network comprised of resistors 210 and 211. This transistor 190 is also coupled by the lead 216 through diode 212 to resistor 206 and a resistance network comprised of resistors 213 and 214. The second transistor 191 of the second transistor flip-flop stage 184 is connected by lead 217 through a diode 218 to resistor 203 and a resistance network comprised of resistors 219 and 220, and also connected by the lead 217 through a diode 221 to resistor 205 and a resistance network comprised of resistors 222 and 223.

The first transistor 190 of the third transistor flip-flop stage 186 is connected by a lead 224 through a diode 225 to the resistor 219, one of the eight word vocabulary magnetic pick-up heads 226 of the multi-head magnetic pickup 23, and a capacitor 227. Lead 224 is also coupled through a diode 228 to the resistor 210, a magnetic pickup head 229, and a capacitor 230. Lead 224 is also coupled through a diode 231 to the resistor 222, a magnetic pickup head 232, and capacitor 233. This lead is also connected through a diode 234 to the resistor 213, a magnetic pickup head 235, and a capacitor 236.

The second transistor 191 of the third transistor flip-flop stage 186 is coupled through a lead 237 and a diode 238 to the resistor 220, a magnetic pickup head 239, and a capacitor 240. This lead 237 is also connected through a diode 241 to the resistor 211, a magnetic pickup head 242, and a capacitor 243. It is also connected through a diode 244 to the resistor 223, a magnetic pickup head 245 and a capacitor 246. It is further connected through a diode 247 to the resistor 214, a magnetic pickup head 248 and a capacitor 249. Capacitors 227, 240, 230, 243, 233, 246, 236, and 249, are also connected to ground 148.

Magnetic pickup heads 226, 239, 229, 242, 232, 245, 235, and 248 are coupled to a transistsor 250 through diodes 251, 252, 253, 254, 255, 256, 257, and 258, respectively, by means of a lead 259. Transistor 250 is coupled to a transistor 251 through an audio transformer 252, a conventional volume control 253, and a capacitor 254 by a lead 255. Transistors 250 and 251 are coupled to the positive side of the first section 142 of the six volt battery through resistors 256 and 257. The collector of transistor 251 is coupled to the positive side of the first section 142 of the 6 volt battery through the earphones 121. The emitters of transistors 250 and 251 as well as a lead 258 from the volume control 253 are connected to the negative side of the first section 142 of the six volt battery.

Biasing resistors 259, 260, 261, 262, 263, and 264 are connected to leads 207, 208, 216, 217, 224, and 237, respectively. These resistors are also connected to lead 140.

Figure 6:
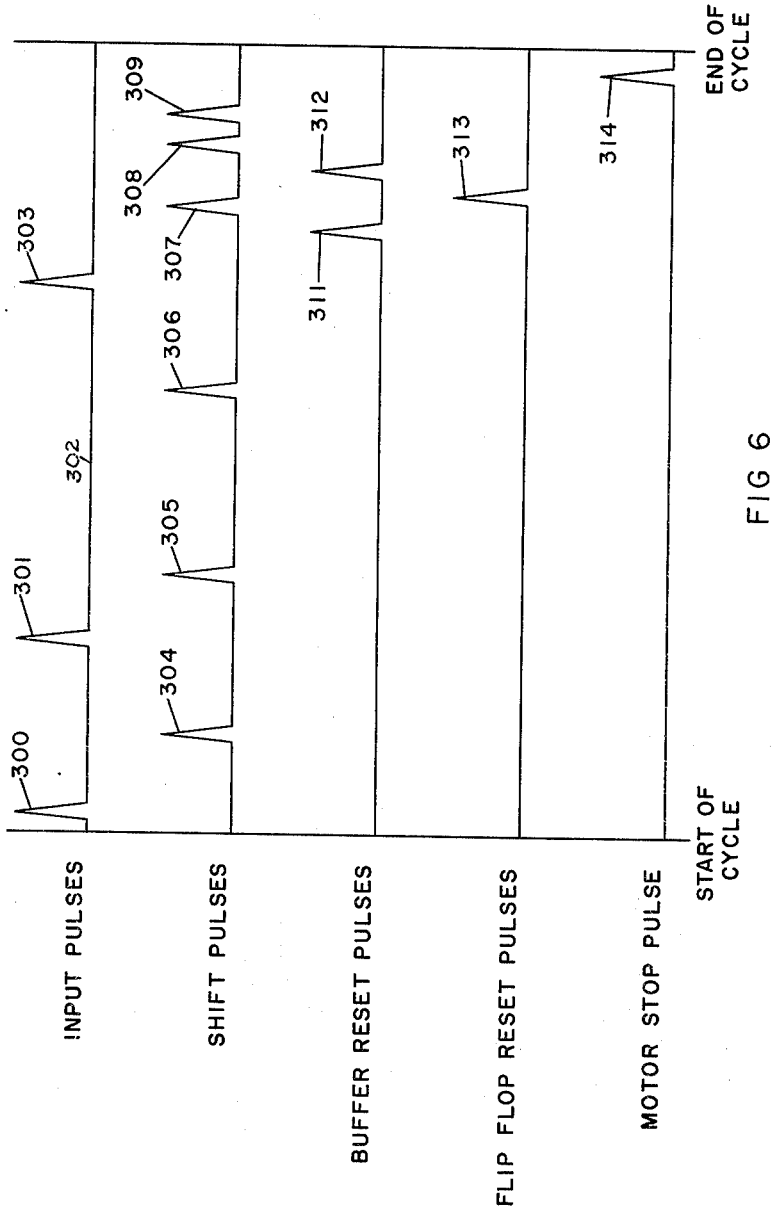
FIG. 6 is a graphical representation of the pulse timing sequence for the electrical circuit illustrated in FIGS. 4 and 5.

The operation of the system described in FIGURES 3, 4, and 5 will now be explained with the use of FIGURE 6 which is a graphical representation of the pulse timing sequence for the electrical control circuit shown in FIGS. 4 and 5. A start pulse and the binary information pulse signals, which are ultimately used to select a word from the receiver vocabulary, are generated in the digital computer 6 and are transmitted to pulse trigger 15 by means of transmitter 7 and receiver 14. For example, it will be assumed that the information bauds consisting of a pulse, a space, and a pulse, written as the binary number 101, must be transmitted to select the desired word. The pulse sequence sent, shown in the top line of FIGURE 6 will be a start pulse 300 followed by a pulse 301, a space 302 and another pulse 303. As the pulses in this sequence are received by the pulse trigger 15, it shapes them and passes them on to the motor control 116 and pulse trigger 15 through leads 120 and 121 as shown in FIG. 4.

When the positive start pulse 300 is transmitted through lead 120 to the motor control 116 it actuates the motor control transistor flip-flop arrangement 123 in such a way that the transistor 136 conducts and the transistor 137 stops conducting. This closes the single pole, single throw switch of relay 124 and connects the motor 12 to the motor power supply 60. The subsequent information pulses 301 and 303 will not affect this circuit while the transistor 136 is conducting. After the motor 12 has turned the magnetic drum 11 one full turn, a stop pulse 314 in FIG. 6, which is permanently recorded on magnetic drum 11 of FIG. 3, is picked up by the magnetic head 143, amplified by the amplifier 146 and passed through lead 145 to the motor control transistor flip-flop arrangement 123, shown in FIGS. 4 and 5. This stop pulse 314 causes the transistor 137 to conduct and causes the transistor 136 to stop conducting. This cuts off relay 124 and opens its single pole, single throw switch, which, in turn, disconnects the motor 12 from the motor power supply 60 and stops the motor 12. The motor control circuit is now in a condition in which it is ready to receive the start pulse for the next cycle. In the meantime, the start pulse 300 is also fed through lead 121 to the shift register 114. The magnetic cores 150, 152, and 154, of shift register 114, were reset at the end of the previous cycle of operation and are now magnetized in a clockwise direction.

When the start pulse 300 is received by lead 121, it magnetizes magnetic core 150 in a counter clockwise direction. Referring to FIGURE 6, after the start pulse 300 is received and before the first information pulse 301 is received by lead 121, a shift pulse 304 is picked up from the magnetic drum 11 by magnetic head 172 and fed through the amplifier 174 and the lead 175 to the shift coils of stages 150, 152, and 154. This shift pulse 304 causes the magnetic core 150 to be magnetized in a clockwise direction and generates a positive pulse in its output coil. This positive pulse is transmitted through the diode 158 into the delay circuit 159. It is then passed into the input coils of cores 152 and 157. As a result, core 152 is magnetized in a counterclockwise direction.

Core 157, which, as will be seen later, is already magnetized in a counterclockwise direction at this stage of the cycle, is not affected. No carry pulse is generated by magnetic cores 152 and 154 so that cores 154, 162, and 167 are not affected. Next, the first information pulse 301 is received through lead 121 by the input coil of magnetic core 150. This causes the core 150 to be magnetized again in a counterclockwise direction. The shift pulse 305 is then picked up from the rotating magnetic drum 11 by the magnetic head 172 and fed through the amplifier 174 and the lead 175 to the shift coils of stages 150, 152, and 154. This shift pulse 305 causes cores 150 and 152 to be magnetized in a clockwise direction and generates positive pulses in the output coils of these stages 150 and 152. These positive pulses are transmitted through diodes 158 and 163 into delay circuits 159 and 164. They are then passed into the input coils of cores 152, 157, 154, and 162; as a result, magnetic cores 152 and 154 are magnetized in a counterclockwise direction. Cores 157 and 162, which are already magnetized in a counterclockwise direction, are not affected. No carry pulse is generated by core 154 so that core 167 is likewise not affected.

The second information baud 302 is a space so that during this time-interval no pulse will be received by lead 121 and magnetic core 150 will remain magnetized in a clockwise condition. Then, shift pulse 306 is picked up from the rotating magnetic drum 11 by magnetic head 172 and is fed through the amplifier 174 and the lead 175 to the shift coils of stages 150, 152, and 154. This shift pulse 306 causes cores 152 and 154 to be magnetized in a clockwise direction and generates positive pulses in the output coils of these stages. These positive pulses are transmitted through diodes 163 and 168 into the delay circuits 164 and 169. They are then passed into the input coils of cores 154, 162 and 167. As a result, core 154 is magnetized in a counterclockwise direction. Cores 162 and 167, which are already magnetized in a counterclockwise direction, are not affected. No carry pulse is generated by core 150 so that core 152 remains magnetized in a clockwise direction.

The third information baud 303 is a pulse which is now received by lead 121 which causes core 150 to be magnetized in a counterclockwise direction. Now the three information bauds are stored in cores 150, 152, and 154. Magnetization in a counterclockwise direction represents a pulse, while magnetization in a clockwise direction represents a space. The start pulse 300 has been shifted out of the shift register 114. The buffer cores 157, 162, and 167 all contain pulses.

After the word, selected in the previous cycle, is spoken in this cycle, the information in the shift register 114 is transferred to the flip-flop register 115 in the following manner. Buffer reset pulse 311 is picked up from the rotating magnetic drum 11 by the magnetic head 178 and is fed through the amplifier 179 and lead 180 to the reset coils of buffer cores 157, 162, and 167. This reset pulse 311 causes cores 157, 162 and 167 to be magnetized in a clockwise direction and generates positive pulses in the output coils of these stages. These positive pulses are transmitted through diodes 183, 185, and 187, causing transistors 190 of transistor flip-flop stages 182, 184, and 186 to conduct and transistors 191 of stages 182, 184, and 186 to be non-conducting.

Next shift pulse 307 is picked up from the rotating magnetic drum 11 by magnetic head 172 and fed through the amplifier 174 and the lead 175 to the shift coils of stages 150, 152, and 154. This shift pulse 307 causes the information bauds in shift register 114 to be transferred in parallel to the buffer cores 157, 162 and 167. Simultaneously, the flip-flop reset pulse 313 is picked up from the rotating magnetic drum 11 by the magnetic head 196 and is fed through the amplifier 197, lead 195, and diodes 198, 199, and 200 to the flip-flop stages 182, 184 and 186. This pulse 313 causes the transistors 191 to conduct and the transistors 190 to be non-conducting.

Next buffer reset pulse 312 is picked up from the rotating magnetic drum 11 by the magnetic pickup head 178 and is fed through the amplifier 179 and the lead 180 to the reset coils of the buffer cores 157, 162, and 167. This causes the information bauds 301, 302, and 303, which are momentarily stored in the buffer cores 157, 162, and 167 to be transferred to the flip-flop stages 182, 184, and 186 where they are held during the next cycle of operation. Next, two more shift pulses 308 and 309 are picked up from the magnetic drum by the magnetic head 172 and are used to clear the shift register 114 for the next cycle of operation. Finally, the stop pulse 314 stops the motor 12 and ends the cycle of operation.

During the next cycle of operation, the word for the binary code 101 is selected as follows. Since the transistor flip-flop stage 182 receives a pulse from the last cycle, transistor 190 of stage 182 will be conducting. Similarly, the transistor 191 of stage 184 will be conducting and the transistor 190 of stage 186 will be conducting. This condition has the following effect on the binary selector switch 119. Lead 207 will be effectively shorted to ground 148 through the transistor 190 of stage 182. This bias diodes 251, 252, 253, and 254 in such a way that they offer high resistance to currents generated by word vocabulary magnetic heads 226, 239, 229, and 242, respectively, so that effectively no signal is collected from these heads by lead 259.

Since transistor 191 of stage 184 is also conducting lead 217 is also effectively shorted to ground 148 through this transistor 191. As a result, diodes 255 and 256 are also biased in such a way that they offer high resistance to currents generated by word vocabulary magnetic pickup heads 232 and 245 as well so that effectively no signal is collected from these heads by lead 259. Finally, transistor 190 of stage 186 is also conducting which effectively shorts leads 224 to ground 148 and results in no signal from head 235 reaching the lead 259. Therefore, when the binary code 101 is received and stored in the flip-flop register 115, on only the signal from magnetic pick-up head 248 will be collected by lead 259.

The selected signal is then amplified by the transistor 250, passed through the coupling circuits 252 and 254 and the volume control 253, amplified once more by the transistor 251 and finally transformed into sound by the earphones 121. In like manner, the transmission of other binary codes will select the signals from the various other heads. By extending the design in the manner indicated, larger vocabularies can be used. The use of each additional baud in the information sequence requires the use of an additional stage in the shift register 114 and the flip-flop register 115 and allows the word vocabulary to be doubled.

Another modification of the present invention would be one in which the words are stored at the receiver in the form of sound tracks on a photographic plate or metal template. The received information pulses would select the sound track to be scanned and the selected word would be reproduced by scanning the plate or template with a light beam or a beam of electrons. The pickup would consist of a photosensitive device used alone or in conjunction with a phosphorescent screen. Otherwise the operation would be similar to that described for the previously mentioned embodiments of this invention.

Obviously many other modifications and variations of the present invention are possible in the light of the above teachings. It is, therefore, to be understood that within the scope of the appended claims the invention may be practiced otherwise than as specifically described.

What is claimed is:

1. Equipment for selecting stored data signals having a broad bandwidth through the agency of information signals of narrower bandwidth, comprising, in combination, data storage means comprising a magnetic drum containing data signals which have a bandwidth of any desired frequency range, said magnetic drum being normally static, means for receiving an information signal consisting of a series of pulses of limited bandwidth and for forwarding said information signal to the rest of said equipment, said information signal being a code predetermined to select a certain data signal from said data storage means, first apparatus including means for rotating said magnetic drum, means responsive to the first pulse of said series of pulses comprising said information signal to connect said rotating means with said magnetic drum to obtain rotation thereof, and means responsive to the rotation of said magnetic drum for resetting said responsive means and disconnecting said rotating means from said magnetic drum to halt the rotation thereof, and second apparatus for receiving said information signal, including said first pulse simultaneously with the reception thereof by said responsive means, and having means for storing and converting said information signal into binary pulses which are characteristic of said information signal, and means inductively linked with said magnetic drum for utilizing said binary pulses to sense and thereby select the desired data signal therefrom.

2. A communications system for the retrieval of stored data, comprising in combination, means for generating and transmitting by radio waves and information signal of at least limited bandwidth, said information signal consisting of a series of pulses and being a code predetermined to select certain stored data, equipment remotely situated from the previous means including data storage means containing data signals which have a bandwith of any desired frequency range, said data storage means being normally static, means for receiving said information signal and for forwarding said information signal to the rest of said equipment, first apparatus including means for rotating said magnetic drum, means responsive to the first pulse of said series of pulses comprising said information signal to connect said rotating means with said magnetic drum to obtain rotation thereof, and means responsive to the rotation of said magnetic drum for resetting said responsive means and disconnecting said rotating means from said magnetic drum to halt the rotation thereof, and second apparatus for receiving said information signal, including said first pulse simultaneously with the reception thereof by said responsive means, and having means for storing and covering said information signal into binary pulses which are characteristic of said information signal, means for utilizing said binary pulses to select the desired data signal therefrom, and means for transforming the data signal selected into a form perceptible by the human senses.

3. The communications system of claim 2 wherein said means for utilizing said binary pulses comprises a selector switch and sensing means and the selected data signal is presented for audible reception.

4. The equipment for selecting stored data signals of claim 1 wherein said responsive means includes a relay element for connection of said rotating means to said magnetic drum and another element responsive to said first pulse to actuate said relay element to obtain said connection, with said another element being reset responsive to the rotation of said magnetic drum and with said relay element being disconnected from said rotating means responsive to the rotation of said magnetic drum.

References Cited by the Examiner

UNITED STATES PATENTS

| | | | |
|---|---|---|---|
| 1,906,646 | 5/33 | Smith | 340—152 |
| 1,993,486 | 3/35 | Ricchiardi | 179—6 |
| 2,167,459 | 7/39 | Long | 340—162 |
| 2,168,460 | 8/39 | Watson | 340—154 |
| 2,233,026 | 2/41 | Mock et al. | 340—162 |
| 2,517,102 | 8/50 | Flory | 179—1 |
| 2,570,716 | 10/51 | Rochester | 340—167 |
| 2,594,713 | 4/52 | Connolly | 340—324.1 |
| 2,603,715 | 7/52 | Vaughan | 340—167 X |
| 2,616,983 | 11/52 | Zworykin | 340—149.1 |
| 2,645,764 | 7/53 | McWhirter et al. | 340—172.5 |
| 2,679,035 | 5/54 | Daniels et al. | 340—324.1 |
| 2,710,392 | 6/55 | Jammer | 340—147 |
| 2,771,509 | 11/56 | Dudley et al. | 179—1 |
| 2,840,637 | 6/58 | McNaney et al. | 340—324.1 |
| 2,888,672 | 5/59 | Young | 340—324.1 |
| 3,063,042 | 11/62 | Bird et al. | 340—172.5 |
| 3,085,228 | 4/63 | Rockola | 340—162 |
| 3,094,684 | 6/63 | Dirks | 340—172.5 |

NEIL C. READ, *Primary Examiner.*

STEPHEN W. CAPELLI, JOHN H. BURNS, *Examiners.*